Aug. 21, 1934.        H. W. LORD        1,971,191
LIGHT RESPONSIVE CIRCUIT CONTROLLER
Filed Nov. 16, 1932

Inventor:
Harold W. Lord,
by Chule V. Tullar
His Attorney.

Patented Aug. 21, 1934

1,971,191

UNITED STATES PATENT OFFICE

1,971,191

LIGHT RESPONSIVE CIRCUIT CONTROLLER

Harold W. Lord, Schenectady, N. Y., assignor to General Electric Company, a corporation of New York Application November 16, 1932, Serial No. 642,923

7 Claims. (Cl. 250—41.5)

My invention relates to light responsive circuit controlling apparatus which is actuated by alternating current and particularly to such apparatus which is adapted to respond when the light received is in impulses that have some particular relation with respect to the waves of said current. One object of my invention is to provide improved apparatus of this character whose response is limited to light impulses which are synchronous and which have a particular phase relation with said current. Another object of my invention is the provision of such apparatus which is simple in construction, efficient in operation and inexpensive to manufacture.

My invention will be better understood from the following description taken in connection with the accompanying drawing, and its scope will be pointed out in the appended claims.

Figure 1:
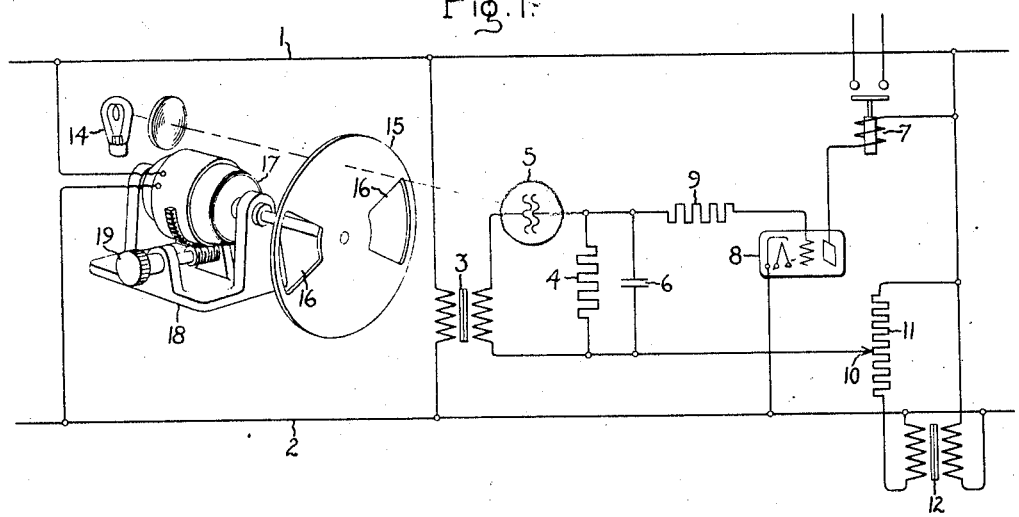
Figure 2:
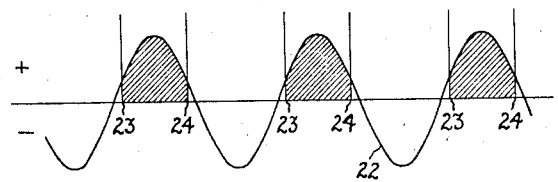

Referring to the drawing, Fig. 1 is a diagram illustrating one embodiment of my invention; and Fig. 2 is a diagram illustrating the relation between the light impulses and the alternating-current waves.

In Fig. 1 of the drawing a source of supply of alternating current is represented at 1 and 2, which for example, may be a 60 cycle, 110 volt circuit. Transformer 3 has its primary connected across the circuit 1, 2 and in series with its secondary are the photo-electric device 5 and the capacitor 6. Device 5 is a non-rectifying photo-electric device, such for example, as a selenium tube whose resistance when dark may be of the order of 20 megohms and when illuminated by $\frac{1}{10}$ of a lumen may be of the order of $\frac{1}{4}$ of a megohm. The resistance of device 5 varies with the amount of light which it receives and being non-rectifying passes current with equal facility in either direction. Capacitor 6 has a relatively large capacity which, for example, may be 4 mf. and in shunt with this capacitor is the high resistance 4 which, for example, may be 5 megohms through which the capacitor may discharge. The charge on capacitor 6 serves to control the current in the load circuit which also connects across the supply circuit 1, 2 and includes the load device 7 which is shown as a relay and the grid controlled electron discharge circuit controller 8. This controller may be a high vacuum discharge device but preferably is a gaseous or vapor discharge device. One side of capacitor 6 connects through the protective resistance 9 with the grid of device 8 and the other side connects with the arm 10 of the potentiometer 11. In order that a suitable negative bias may be applied to device 8 to prevent its being turned on when such is not desired one end of the potentiometer connects through the secondary of transformer 12 with supply lead 2 while the other end connectes directly with supply lead 1. The primary of this transformer is shown connected directly across the supply circuit 1, 2. By this means the difference of potential across the potentiometer is greater than that across the supply circuit 1, 2 by an amount equal to that of the transformer secondary so that during the positive half wave of the supply circuit when lead 2 is negative with respect to lead 1, arm 10 of the potentiometer may be negative to lead 2 and hence to the cathode of device 8.

The apparatus which I have described above is adapted to respond to light impulses which are synchronous and have a particular phase relation with the alternating current supplied to the apparatus. Various means may be provided for producing such light impulses, for example, a discharge lamp such as a neon lamp producing one flash per cycle may be operated from the same supply circuit as the control apparatus and may have the phase of its flashes varied by well known means.

In the preferred form of my invention I employ a light source 14 which for convenience is represented as an incandescent lamp and which may or may not be operated from the source of supply 1, 2. Between the lamp 14 and the photo-electric device 5 I have shown the rotatable shutter 15 which in the present case has two opposite open sectors 16 through which light may pass from the lamp to the photo device. The shutter is operated by the synchronous motor 17 which is energized from the supply circuit 1, 2 and for the purpose of providing for phase adjustment of the light impulses with respect to the wave of the alternating-current supply the motor is shown by way of example as mounted for angular adjustment in the frame 18, suitable adjusting means being represented at 19. Inasmuch as the shutter 15 is provided with two opposite openings the motor 17 need operate at a speed which is only one half of the frequency of the supply circuit.

In Fig. 2 I have represented at 22 the alternating-current wave of the supply circuit, it being assumed that the positive half waves are those at which the anode of device 8 is positive and hence passes current. The openings 16 in the shutter may be of such a size that light is admitted to the photo-electric device throughout each entire positive half wave of the supply circuit; however, I prefer to make the light openings somewhat narrower in order that the intervals of light shall be somewhat less than the complete positive half cycles. This is represented in Fig. 2 where the shutter admits light to the photo tube at 23 and cuts it off again at 24.

Assuming that the voltage induced in the secondary of transformer 3 is in such a direction that that side of capacitor 6 which connects with the grid device 8 is given a positive charge at the same time that the anode of device 8 is positive, each successive light impulse momentarily lowers the resistance of the photo device in accordance with its intensity and causes the capacitor 6 to receive an increment of charge, the accumulated charge soon becoming sufficient to produce a capacitor voltage to overcome the grid bias on device 8. Since the photo device is dark during each negative half wave, the charge received by the capacitor during the positive half waves cannot readily escape through the photo device. As a result the negative bias on the grid of device 8 is overcome and the device conducts current as long as the impulses continue. If the phase of the light impulses is changed by the rotatable adjustment of motor 17 to include a portion of a negative half wave, the charge received by the capacitor through each positive half wave may discharge through a portion of each adjacent negative half wave. Such discharge may occur if the light interval is shifted only a very slight amount which may not even include any portion of the negative half cycle. Hence the accumulated charge on capacitor 6 may never reach a sufficient value to overcome the bias on the grid of device 8.

From the above it will be seen that the circuit of the load device 7 may be controlled either by varying the intensity of the light impulses which reach the photo device 5, provided they have the correct phase relation with respect to the alternating current supply, or by varying the phase angle of the impulses from a light source which operates at a uniform intensity. An advantage of this construction is that it is insensitive to a steady light thrown upon the device 5 and is sensitive only to light impulses which are synchronous with the alternating current and which have the proper phase relation with respect to the half waves thereof. A construction such as described may be employed, for example, to control the automatic opening of garage doors in response to a light beam of a particular character. With this apparatus the steady light from the headlights of a car having the usual lighting system would be ineffective to operate the door control apparatus; however, the apparatus would respond to light from a car provided with suitable means to produce an intermittent beam whose frequency could readily be varied to pass through the particular frequency at which the apparatus is constructed to respond. Such a construction may also be employed to detect the presence of a person in a forbidden place such as near a bank vault. As long as the photo device continuously receives an intermittent light beam of the proper frequency and phase relation with respect to the circuit supplying it, no alarm is given. Should the beam be interrupted by the person, an alarm would be given and the effect of the interruption would not be avoided by the person directing the rays of a flash lamp into the photo device during the interruption since such rays would be steady.

While I have shown a means for producing light impulses which occur with regularity the operation of the apparatus is not dependent upon the regular occurrence of light flashes since light flashes which occur at irregular times would also actuate the apparatus, provided of course that the light intervals come during the positive half waves and have the proper phase relation with those waves. In either case the light flashes occur in synchronism with the positive half waves of the supply circuit.

If desired, the apparatus may be operated in the reverse sense, that is, the occurrence of light flashes may serve to turn off the device 8 rather than to turn it on. This reversed action may be obtained in an obvious manner simply by making the grid biasing potential positive when the anode of device 8 is positive and by arranging the capacitor 6 to supply a negative voltage rather than a positive voltage to the control grid.

I have chosen the particular embodiment described above as illustrative of my invention and it will be apparent that various other modifications may be made without departing from the spirit and scope of my invention which modifications I aim to cover by the appended claims.

What I claim as new and desire to secure by Letters Patent of the United States, is:

1. Light responsive circuit controlling apparatus comprising a source of supply of alternating current, an electron discharge circuit controller energized from said source and having a control grid, a non-rectifying photo-electric device in circuit with said source, energy storing means of relatively large capacity arranged to be charged by the current passing said device and means for applying the charge of said storing means to said grid, the capacity of said storing means being so high that the charge received thereby during a single half wave of said current is insufficient to cause the actuation of said circuit controller.

2. Light responsive circuit controlling apparatus comprising a source of supply of alternating current, an electron discharge valve in circuit with said source and having a control grid, means for biasing the grid from said source, a non-rectifying photo-electric device connected with said source, a low inpedance capacitor arranged to be charged by the current passing said device and means for conducting a charge from said capacitor to said grid, the impedance of said capacitor being so low relative to the impedance of said device that the charge received by the capacitor during a single half cycle is insufficient to cause the actuation of said valve.

3. Light responsive circuit controlling apparatus comprising a source of supply of alternating current, a grid controlled electron discharge device connected to be energized therefrom, a non-rectifying photoelectric device connected to be energized from said source, means for illuminating said photoelectric device in impulses synchronous with said current, a capacitor of relatively large capacity arranged to be charged in increments by the current impulses passing said photoelectric device and means for charging said grid from said capacitor, the capacity of said capacitor being so high that the charge accumulated thereon from a plurality of successive charge increments is required to actuate said discharge device.

4. Light responsive circuit controlling apparatus comprising a source of supply of alternating current, a grid controlled electron discharge device connected to be energized therefrom, a photoelectric device connected to be energized from said source, means for illuminating said photoelectric device in impulses synchronous with said current, means for varying the phase relation of the light impulses and the supply current, a capacitor connected with said photoelectric device to receive successive charge increments therefrom and means for conducting the accumulated capacitor charge to said grid, the capacity of said capacitor being so high that the charge accumulated thereon from a plurality of successive charge increments is required to actuate said discharge device.

5. Light responsive circuit controlling apparatus comprising a source of alternating current supply, a grid controlled vapor electric discharge device connected to be energized therefrom, a selenium tube energized from said source, a capacitor of relatively large capacity arranged to be charged by the current passing said tube, means for charging said grid from said capacitor, means for applying a negative bias to said grid and means for illuminating said tube in impulses synchronous with the current supplied, said capacitor having a capacity so high that the vapor device is caused to pass current only after the capacitor has received a total charge of predetermined number of successive charge increments each resulting from a light impulse.

6. Light responsive circuit controlling apparatus comprising a source of supply of alternating current, a grid controlled gaseous discharge device and a load device connected in series with said source, means for supplying a biasing voltage to said grid, a selenium tube energized from said source, a capacitor of relatively large capacity in series therewith and means for supplying an operating voltage from said capacitor to said grid, the capacity of said capacitor being so large that the charge received thereby through said tube during a single half cycle produces a grid voltage less than that required to trip the discharge device.

7. In combination, a source of alternating current and circuit controlling apparatus adapted to be responsive only to light modulations having substantially the same frequency as said alternating current and having a predetermined phase relation therewith, said apparatus comprising a non-rectifying photo-electric device and a capacitor connected to be supplied in series from said source, and an electron discharge device energized from said source and having a grid connected to be controlled by the charge on said capacitor, the capacitance of said capacitor being so large that the accumulated charge thereon from a plurality of successive charge increments of like sign corresponding to a plurality of light modulations is required to cause said discharge device to operate.

HAROLD W. LORD.